Oct. 28, 1930.  C. L. PAULUS ET AL  1,779,853
METHOD OF TIMING THE SPEED OF OBJECTS AND APPARATUS THEREFOR
Filed Feb. 1, 1926

INVENTORS
CHARLES L. PAULUS
ROBERT KAUCH
BY
ATTORNEY

Patented Oct. 28, 1930

1,779,853

UNITED STATES PATENT OFFICE

CHARLES L. PAULUS AND ROBERT KAUCH, OF DAYTON, OHIO

METHOD OF TIMING THE SPEED OF OBJECTS AND APPARATUS THEREFOR

Application filed February 1, 1926. Serial No. 85,403.

The present invention relates to a timing device for measuring the speed of a fast moving object over the ground, in which the object is sighted through suitable means embodied in the device and maintained in a definite position with respect to the device during the period of travel of the object.

This invention has for its main object a means for timing the passage of a moving object through a pre-determined distance in which the stations designating the timing period are located adjacent the path in which the object is traveling.

It has for its second object means for obtaining the rate of speed of the object during the whole or any part thereof of its movement over the course, as the case may be, and for securing a permanent record of the rate of speed of the object over the pre-determined course.

Another object of the invention is the elimination of personal error bound to occur in the actuation of other mechanical devices.

A further object is the provision in a timing camera of an adapter by means of which a picture of a timing indicator is pictured simultaneously with the object and a pylon or marker which is being passed.

To these and other ends, the nature of which will be readily understood, as the invention is hereinafter disclosed, the invention consists in the improved construction and combination of parts, hereinafter fully described, illustrated in the accompanying drawings, and more particularly pointed out in the appended claims.

In the accompanying drawings, similar reference characters indicate similar parts in all the views in which:

Fig. 1 is a diagrammatic explanation of the use of the device.

Fig. 2 is a side elevation of the device.

Fig. 3 is a plan view thereof.

Fig. 4 is an enlarged section of the illuminating adapter shown attached to the device in Fig. 2.

Fig. 5 is a view showing the use of the sighting members.

Fig. 6 is a picture as is obtained through the eye of the camera, and

Fig. 7 is a wiring diagram showing the electrical connections controlling the device.

While the present invention is designed more particularly for the timing of aircraft, it is applicable for use under other conditions, as for instance, the timing of a projectile or other objects, and it is to be understood that such various uses are contemplated by the invention.

The apparatus employed is in the form of a high speed camera 10 of the moving picture type. This camera is mounted on the rotatable table 11 and driven at a constant speed by the electric motor 12. The rotatable table 11 is journaled in the base 13 and rotated through actuation of the handwheel 14 journaled in the bracket 15 integral with the base. A pinion 16 is rotatably mounted intermediate the ends of the bracket 15, and on the same shaft with the handwheel 14, and meshes with the teeth 17 of the rotatable table 11. The rate of rotation of the table is caused to coincide with the speed of movement of the object by the use of the sighting wires 18 and 19 mounted on the side of the camera 10 by the use of sighting wire standards 20.

An electric contact 21 located along the outer edge of the rotatable table 11 is in slidable contact with a shoe 22 fixedly mounted to the bracket 23 through the use of screws 24. The contact and shoe are provided to automatically govern the starting and stopping of the motor 12, in that contact is made at a certain point during the rotation of the table 11, and later broken in the same manner.

The camera 10 used in connection with the device is of a conventional type with the exception of the modifications shown in Fig. 4 in which the lens mounting is replaced by a main housing or adapter 25 which contains the prism 26, mounted adjacent the lower edge of the lens 27 of the camera.

A downwardly projecting housing 28 integral with the main housing 25 contains a lens 29 intermediate the prism 26 and a stop watch or chronometer 30, and in close proximity to the same. The chronometer is illuminated by an electric light bulb 31 which is located in a recess 32 of the housing 28. The illumination provided by the electric light is reflected by the face of the chronometer, straightened by the lens 29 and deflected by the prism 26, so as to record on the film of the camera.

This may be more fully understood by observing Fig. 6 which clearly demonstrates the results obtained by the camera. The figure shows a picture of the object at the instant of passing a pylon 34, one of which is placed a known distance from a similar pylon, as at points H and H' of Fig. 1, the purpose of which will be hereinafter described.

Hair lines 33 are photographed on the film as shown in Fig. 6 and is accomplished by any well-known optical system adapted for this purpose. These hair lines are spaced a known distance apart and are used as a known value in the computation of the speed of the object. That is, the rapid rate of speed of the camera should provide a picture of the airplane exactly in line with the pylons on the course of the plane, but should the airplane pass this point at the instant when the camera is out of operation, the error could be readily calculated by the use of the engraved lines as previously described.

In operation the device is as follows: Observing Fig. 1 on the drawing, two timing devices are set up at either end of the course to be timed at the points G and G' off the course. The object, in this case an airplane, is picked up by the operator at the first of two points B and C which are conveniently located on the course A. Having been picked up at point B, the airplane is followed along the course A through the use of sighting wires conveniently located on the side of the camera, as shown in Figs. 2 and 5, until the point D is reached and at which point the camera is automatically thrown in actuation by the action of the contacts 21 and 22 of the device. The movement of the airplane is recorded by pictures, as shown in Fig. 6, from the time it passes the point D past the point H representing the pylon until after passing point E, from which a record of the exact time when the plane passes the point H is obtained. After passing point E, the camera which has initially picked up the airplane in its flight over the course is automatically stopped due to the electric circuit being broken between the contact and shoe. The second operator at a distance J down the course picks up the airplane in the same manner as has just been described, and the airplane is timed when passing a second predetermined point H'. The chronometers in both devices being electrically or in any well known manner synchronized in operation, it is evident that a comparison of the resultant photographs will give a very accurate record of the exact time consumed in the passage of the airplane from the one timing station to the other. The points G, G' shown in Fig. 1, which correspond to the positions at which the timing devices are stationed, should be conveniently located on lines which are at right angles to the points H and H' on the course A, and at which points pylons 34 are stationed, but their positions affect the accuracy of the device very slightly, since a very accurate record is obtained from the resultant photographs, and the amount of error can be closely figured out from an examination of the different positions of the object with regard to the hair lines appearing on the photograph and the pylon.

The exact time that the object passes pylons at the points H and H' being recorded on the pictures of the object as it passes these points, and the distance between the pylons being known, it is a mere matter of computation to find the exact speed of the object. It will be apparent that a single timing camera may be used to time an object passing a short distance across the front of the camera device, by making corrections for the angles involved in sighting the points D and E with the pylons at these points.

We claim:

1. An apparatus of the class described comprising a camera provided with driving mechanism, a base for said camera, means for angularly moving said camera relative to said base and means operatively connecting and disconnecting said first mentioned means and said driving mechanism for automatically starting and stopping said driving mechanism at predetermined periods in the angular movement of said camera.

2. An apparatus of the class described comprising a camera with driving mechanism for intermittently feeding a film, a time registering device cooperating with said driving mechanism for recording the time of each exposure of said camera on said film, a base for said camera, means for angularly moving said camera relative to said base and means for operatively connecting and disconnecting said first mentioned means and said driving mechanism for automatically starting and stopping said driving mechanism at predetermined periods in the angular movement of said camera.

3. An apparatus of the class described, comprising a camera provided with driving mechanism, a base for said camera having a movable member and a fixed member, said camera being mounted on said movable member, means for moving said movable member angularly relative to said fixed member and electrical means operative in connection with said driving mechanism for automatically starting and stopping said driving mechanism at predetermined points in the angular movement of said camera.

4. An apparatus of the class described, comprising a camera provided with driving mechanism, a base for said camera having a movable member and a fixed member, said camera being mounted on said movable member, means for moving said movable member angularly relative to said fixed member, projections on said movable and fixed members provided with electrical contacts electrically connected with said driving mechanism whereby an electrical circuit is made at a predetermined angular position of said camera.

5. An apparatus of the class described, comprising a camera provided with driving mechanism, a base for said camera having a movable member and a fixed member, said camera being mounted on said movable member, means for rotating said movable member relative to said fixed member and electrical means adapted to be operatively connected with said driving mechanism for automatically starting said driving mechanism comprising contacts on said movable and fixed members whereby an electrical circuit is made at a predetermined angular position of said camera.

6. An apparatus of the class described, comprising a camera provided with driving mechanism, a base for said camera having a movable member and a fixed member, said camera being mounted on said movable member, means for rotating said movable member relative to said fixed member and electrical means operatively connected with said driving mechanism for automatically starting and stopping said driving mechanism, said electrical means comprising contacts projecting from said movable and fixed members whereby an electric circuit is made and broken at predetermined angular positions of said camera.

In testimony whereof we affix our signatures.

CHARLES L. PAULUS.
ROBERT KAUCH.